April 2, 1968 P. W. CHASE 3,375,928
METHOD AND APPARATUS FOR CONTROLLING THE LEVEL OF AN INTERFACE
Filed Dec. 28, 1965
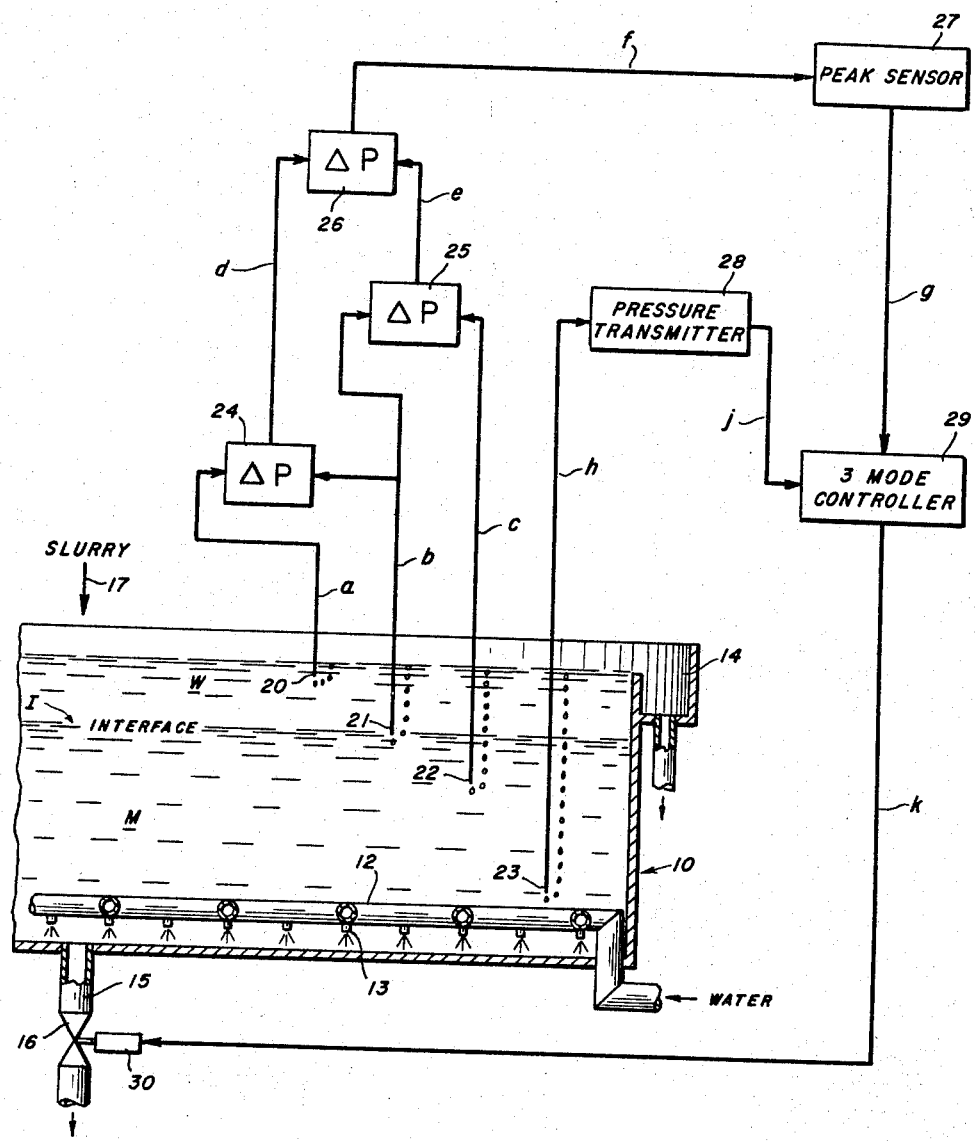
INVENTOR
PAUL W. CHASE
By Donald G. Dalton
Attorney United States Patent Office 3,375,928
Patented Apr. 2, 1968

3,375,928
METHOD AND APPARATUS FOR CONTROLLING THE LEVEL OF AN INTERFACE
Paul W. Chase, Mountain Iron, Minn., assignor to United States Steel Corporation, a corporation of New Jersey
Filed Dec. 28, 1965, Ser. No. 517,032
10 Claims. (Cl. 210—83)

ABSTRACT OF THE DISCLOSURE

A control for holding an interface between two liquids at a predetermined level. Useful where a slurry continuously feeds into a vessel, and overflow and underflow products continuously discharge therefrom, but the interface between the two products may be poorly defined. The control measures pressures at four levels in the vessel, and by taking differences and sensing peaks, regulates the rate of discharge of the underflow to hold the interface.

---

This invention relates to an improved method and apparatus for controlling the level of an interface between two liquids.

Although my invention is not thus limited, one application in which my control is particularly useful is in a desliming operation for beneficiating certain minerals, such as a concentrate of magnetic fines. A conventional deslimer includes a large cylindrical vessel which has a network of water inlets distributed across its bottom. A water suspension of mineral concentrate particles, along with a few middling particles, feeds to the top of the vessel. Water and middling particles overflow around the upper edge of the vessel, while concentrate particles discharge from the bottom. At some level within the vessel there is an interface between the heavier concentrate below and the lighter water and middlings above, but the interface often is diffuse and poorly defined. To achieve a good separation between concentrate and middlings, the concentrate should be withdrawn at a controlled rate which maintains the interface at a constant level just below the overflow. The rate and character of the feed often vary; hence the interface can be held at the desired level only with frequent adjustments in the rate at which concentrate is withdrawn. Nevertheless it is apparent my invention has broader application where similar problems are encountered.

An object of my invention is to provide an improved method and apparatus for automatically controlling the discharge rate from the bottom of a vessel to maintain an interface within the vessel at a nearly constant level close to the top of the vessel.

A further object is to provide a method and apparatus for controlling the level of an interface even though the interface is diffuse and poorly defined.

A further object is to provide a method and apparatus of the foregoing type which is readily added to existing installations and which utilizes only a combination of standard commercially available instruments.

In the drawing:

The single figure is a diagrammatic vertical sectional view of a deslimer equipped with a control apparatus in accordance with my invention.

The drawing shows a conventional deslimer which includes a large cylindrical vesel 10, a network 12 of water inlet pipes just above the bottom of the vessel, a large number of nozzles 13 projecting downwardly from the pipes, an overflow trough 14 at the upper edge of the vessel, and a discharge line 15 connected to the bottom of the vessel. Line 15 is equipped with adjustable means for regulating the rate at which material can discharge. I illustrate a single line 15 which contains an adjustable valve 16 for this purpose, but it is apparent there could be two or more parallel lines, or that other adjustable means could be used, such as a variable speed pump. A water slurry of mineral concentrate particles, along with a few middling particles, feeds to the top of the vessel near the center through conventional means 17, indicated only schematically. A typical deslimer vessel may be about 18 feet in diameter and about 6 feet deep. About 350 to 400 gallons per minute of water may be introduced to the bottom of a vessel of this size. In the example of magnetite, about 35 to 40 long tons per hour may be fed to the top of such a vessel in the form of water slurry which contains about 20 to 30 percent by weight of solids. The overflow should contain less than 1 percent solids, and the underflow about 50 percent solids.

As shown in the drawing, heavier concentrate particles M occupy most of the volume of the vessel, while a relatively thin layer W of water and lighter particles overlies the concentrate. The interface I between the two layers should be located no more than about 3 inches below the upper surface of the water layer W. Desirably the interface is maintained at a nearly constant level, preferably no more than ±½ inch from its chosen level. If the interface rises, concentrate particles tend to be lost in the overflow. If it falls, middling particles tend to enter the concentrate and lower its grade. The level of the interface is controlled by adjusting the valve 16 as the rate or character of the feed changes.

In accordance with my invention, I promise four conventional bubbler tubes 20, 21, 22 and 23 (or equivalent pressure-sensing devices) at different levels within vessel 10. Preferably I mount the bubbler tubes on racks (not shown) which enable their depth to be adjusted. The bottom tip of the first or uppermost bubbler tube 20 lies immediately below the upper surface of the water layer W, the level of which is determined by the overflow 14. The bottom tip of the second bubbler tube 21 lies at the chosen level of the interface I. The bottom tip of the third bubbler tube 22 lies a given distance below the chosen level of the interface, conveniently a distance equal to that between the bubbler tubes 20 and 21. The bottom tip of the fourth or lowermost bubbler tube 23 lies well below the interface, and its purpose is described later. As is well known, I use a purge system to supply small streams of air to the bubbler tubes. One example of a suitable mechanism is available commercially from Moore Products Company, Philadelphia, Pa. as the Type 63BD4A Flow Controller and Rotameter Assembly.

The first and second bubbler tubes 20 and 21 transmit to a first differential pressure transmitter 24 pneumatic pressure signals $a$ and $b$ respectively, the magnitudes of which represent pressures near the upper surface and at the chosen level of the interface. The second and third bubbler tubes 21 and 22 transmit to a second differential pressure transmitter 25 pneumatic pressure signals $b$ and $c$ respectively. The magnitude of the latter signal represents the pressure a given distance below the chosen level of the interface. The first and second transmitters 24 and 25 transmit to a third differential pressure transmitter 26 pneumatic pressure signals $d$ and $e$ respectively, the magnitudes of which represent the difference between signals $a$ and $b$ and the difference between signals $b$ and $c$. The third transmitter 26 transmits a pneumatic pressure signal $f$, the magnitude of which represents the difference between signals $d$ and $e$. The three differential pressure transmitters 24, 25 and 26 are conventional instruments available commercially. The first and second transmitters 24 and 25 may operate with input pressures of 0–5 inches of water and have outputs of 3–15 p.s.i.g. Examples of suitable instruments are those available from Moore Products Company, Model 1120C, or from Taylor Instrument Company, Rochester, N.Y., Model 212TD11024. The third transmitter 26 may operate with input pressures of 0–100 inches of water and have outputs of 3–15 p.s.i.g. Examples of a suitable instrument are those available from the same suppliers, Model 11C100 or 212TD11011 respectively. The Taylor instruments are described in a printed publication by the supplier, entitled, "Taylor 212T Transcope Flow/DP Transmitter," Bulletin 98413, dated April 1962.

The magnitude of signal $f$ reaches a maximum whenever the interface I is exactly at the bottom tip of the second bubbler tube 21, and diminishes as the interface either rises or falls from this level. This fact can best be demonstrated by considering an exemplary set of conditions. Suppose the bottom tip of the second bubbler tube 21 is 3 inches below the first bubbler tube 20, and the bottom tip of the third bubbler tube 22 is 3 inches below the second. The specific gravity of the water layer W is substantially 1, and of the concentrate M about 1.3. The following table shows the magnitudes of the different signals in inches of water when the interface is exactly at the bottom tip of the second bubbler tube 21, one inch above, and one inch below.

|  | (a) | (b) | (c) | (d) | (e) | (f) |
|---|---|---|---|---|---|---|
| Interface at 21 | 0 | 3.0 | 6.9 | 3.0 | 3.9 | 0.9 |
| Interface 1 inch above 21 | 0 | 3.3 | 7.2 | 3.3 | 3.9 | 0.6 |
| Interface 1 inch below 21 | 0 | 3.0 | 6.6 | 3.0 | 3.6 | 0.6 |

It can be demonstrated readily that the foregoing relation applies for any other set of conditions and also applies whether or not the interface is well defined.

The magnitude of signal $f$ increases or decreases as the interface I moves toward or away from the second bubbler tube 21, and remains constant only when the interface is stationary. When the interface has been approaching the bubbler tube and goes a little beyond, the magnitude reaches a peak and thereupon commences to decrease. Signal $f$ goes to a peak sensor 27, which transmits a pneumatic pressure signal $g$, the magnitude of which continually varies, either increasing or decreasing. The magnitude of signal $g$ continues to change in the same direction (up or down) as long as the magnitude of signal $f$ is constant or increasing. Whenever the magnitude of signal $f$ commences to decrease after reaching its peak, the variation in magnitude of signal $g$ commences to go the other way. After this occurs, there is a preset delay during which changes in the magnitude of signal $f$ are ineffective. This delay allows the process to respond to the reversal. Thereafter the cycle repeats. The peak sensor likewise is a standard instrument available commercially. One example of a suitable instrument is that supplied by Moore Products Company as the "Moore Model 571 Optimizer," and is described in a printed publication by the supplier entitled, "Instructions for the Installation, Operation and Maintenance of the Moore Model 571 Optimizer."

I recognize that it is known to use three bubbler tubes and three differential pressure transmitters to control the level of an interface between immiscible liquids where the interface is well-defined and located a substantial distance below the top of the vessel. Under such conditions the three bubbler tubes can be at widely separated levels. By itself this form of control is not suited for my purpose where the interface is poorly defined and there is only a short vertical distance between the tips of the bubbler tubes. If the interface once drops to the bottom tip of the lowermost bubbler tube, all control would be lost. Hence I use the fourth bubbler tube 23 to prevent this, as hereinafter explained.

The fourth bubbler tube 23 transmits a pneumatic pressure signal $h$, the magnitude of which represents the product of the depth and apparent specific gravity of material in vessel 10. Signal $h$ goes to a pressure transmitter 28, which transmits to a three-mode controller 29 an amplified pneumatic pressure signal $j$. Controller 29 transmits a pneumatic pressure signal $k$ to a conventional operating device 30 for valve 18. If controller 29 receives signal $j$ alone, it would regulate the adjustment valve 18 in a way that would maintain constant pressure at the fourth bubbler tube 23. Because the character of material feeding to vessel 10 changes, this form of control would not regulate the position of the interface. Accordingly signal $g$ goes to the controller to adjust the set point thereof as the interface rises and falls. Signal $k$ is a function of the difference between the set point signal $g$ and the pressure signal $j$. As a consequence, the interface level remains within about ½ inch of the tip of the second bubbler tube 21. The transmitter 28 and controller 29 also are standard instruments available commercially. Transmitter 28 can be similar to transmitter 26, except that it may operate with an input pressure of 0–50 inches of water. An example of a suitable controller 29 is that supplied by Moore Products Company as the 526MP5T2 cascade control station, in combination with a Model 509M controller. Another example is that supplied by Taylor Instrument Company as the Model 92KF241 for cascade service, in combination with a controller such as their 404F0051. The Moore instruments are described in printed publications by the supplier entitled "Condensed Catalog of Moore Products," 9th edition, and "Moore Nullmatic Controller," Bulletin 5018. The Taylor instruments are described in printed publications by the supplier entitled "905 Series Transcope Recorder," Catalog 98286, and "Transcope Pneumatic Recorder," Bulletin 98278.

From the foregoing description it is seen that my invention affords a simple and precise method and apparatus for maintaining an interface between two liquids at a desired level. The apparatus utilizes only a combination of standard instruments which are readily available, and it can be added to existing installations without otherwise altering their structure.

While I have shown and described only a single embodiment of my invention, it is apparent that modifications may arise. Therefore, I do not wish to be limited to the disclosure set forth but only by the scope of the appended claims.

I claim:

1. In an operation which includes feeding liquid material to a vessel, which material forms upper and lower layers within the vessel having an interface therebetween, said upper layer being relatively thin compared with said lower layer, overflowing material from said upper layer at the top of the vessel, and discharging material from said lower layer at the bottom of the vessel, the combination therewith of a method of maintaining said interface substantially at a chosen level a short distance below the top of said upper layer, said method comprising developing a signal, the magnitude of which reaches a peak whenever said interface is at said level and diminishes when said interface either rises or falls from said level, sensing peaks in the magnitude of said signal, controlling the rate at which material discharges from the bottom of the vessel in accordance with the pressure well below said interface to maintain a predetermined depth of material in the vessel, and setting the means which effects such control in accordance with said signal to maintain the magnitude of the signal near its peak.

2. A method as defined in claim 1 in which said operation is a desliming operation for an ore concentrate, said upper layer consists of water and middling particles and has a maximum thickness of about 3 inches, and said lower layer consists of a water suspension of concentrate particles, and the interface between said layers is poorly defined.

3. A method as defined in claim 1 in which said signal is developed by measuring pressures at said level and at given closely spaced distances thereabove and therebelow, and determining differences in the pressures thus measured.

4. A method as defined in claim 3 in which peaks in said signal are sensed by noting points at which the magnitude of the signal commences to decrease after it has been increasing, and in which a second signal is changed with each peak to set the control means.

5. In an installation which includes a vessel, means for feeding liquid material to the top of said vessel, which material forms upper and lower layers within the vessel having an interface therebetween, said upper layer being relatively thin compared with said lower layer, means at the top of said vessel for overflowing material of the upper layer, and adjustable means connected to the bottom of said vessel for withdrawing material of the lower layer, the combination therewith of an apparatus for maintaining the interface substantially at a chosen level a short distance below the top of said upper layer, said apparatus comprising means operatively connected with said vessel for developing a signal, the magnitude of which reaches a peak whenever the interface is at the chosen level and diminishes when the interface either rises or falls from this level, sensing means operatively connected with said signal-developing means for determining peaks in the magnitude of the signal, pressure-responsive means operatively connected with said vessel and with said adjustable means for controlling the rate at which material is withdrawn from the bottom to maintain a constant depth of material in said vessel, and means operatively connecting said sensing means with said pressure-responsive means to set the latter in accordance with the signal to maintain the magnitude of the signal near its peak.

6. An apparatus as defined in claim 5 in which said signal-developing means includes means for measuring pressures at the chosen interface level and at given closely spaced distances thereabove and therebelow, and means operatively connected with said pressure-measuring means for determining differences in pressures measured thereby.

7. An apparatus as defined in claim 5 in which said signal-developing means includes means for measuring pressures at the chosen interface level and at given closely spaced distances thereabove and therebelow, a first differential pressure transmitter operatively connected with the means for measuring pressures at the chosen interface level and thereabove, a second differential pressure transmitter operatively connected with the means for measuring pressures at the chosen level and therebelow, and a third differential pressure transmitter operatively connected with said first and second transmitters.

8. In a desliming installation which includes a vessel, means for introducing water streams to the bottom of said vessel, means for feeding a water suspension of concentrate particles along with a few middling particles to the top of said vessel, which suspension forms a lower layer of concentrate particles and an upper layer of water and middling particles within the vessel, said upper layer having a maximum thickness of about 3 inches, there being a poorly defined interface between the two layers, means at the top of said vessel for overflowing material of the upper layer, and adjustable means connected to the bottom of said vessel for withdrawing material of the lower layer, the combination therewith of an apparatus for maintaining the interface substantially at a chosen level, said apparatus comprising means operatively connected with said vessel for developing a signal, the magnitude of which reaches a peak whenever the interface is at the chosen level and diminishes when the interface either rises or falls from this level, sensing means operatively connected with said signal-developing means for determining peaks in the magnitude of the signal, pressure-responsive means operatively connected with said vessel and with said adjustable means for controlling the rate at which material is withdrawn from the bottom to maintain a constant depth of material in said vessel, and means operatively connecting said sensing means with said pressure-responsive means to set the latter in accordance with the signal to maintain the magnitude of the signal near its peak.

9. An apparatus as defined in claim 8 in which said signal-developing means includes means for measuring pressures at the chosen interface level and at given closely spaced distances thereabove and therebelow, and means operatively connected with said pressure-measuring means for determining differences in pressures measured thereby.

10. An apparatus as defined in claim 8 in which said signal-developing means includes means for measuring pressures at the chosen interface level and at given closely spaced distances thereabove and therebelow, a first differential pressure transmitter operatively connected with the means for measuring pressures at the chosen interface level and thereabove, a second differential pressure transmitter operatively connected with the means for measuring pressures at the chosen level and therebelow, and a third differential pressure transmitter operatively connected with said first and second transmitters.

References Cited

UNITED STATES PATENTS 2,964,443  7/1960  Schmidt _____ 210—114 X

FOREIGN PATENTS 1,139,763  7/1957  France.

SAMIH N. ZAHARNA, *Primary Examiner.*

REUBEN FRIEDMAN, *Examiner.*

D. RIESS, J. W. ADEE, *Assistant Examiners.*

UNITED STATES PATENT OFFICE

CERTIFICATE OF CORRECTION

Patent No. 3,375,928                          April 2, 1968

Paul W. Chase

It is certified that error appears in the above identified patent and that said Letters Patent are hereby corrected as shown below:

Column 1, line 28, "magnetic" should read -- magnetite --. Column 2, line 29, "promise" should read -- position --. Column 6, line 45, "2,964,443" should read -- 2,946,443 --.

Signed and sealed this 19th day of August 1969.

(SEAL)
Attest:

Edward M. Fletcher, Jr.
Attesting Officer

WILLIAM E. SCHUYLER, JR.
Commissioner of Patents